May 29, 1951  G. E. DATH  2,554,562
LEVER MECHANISM

Filed July 16, 1949  3 Sheets-Sheet 2

Inventor:
George E. Dath.
By
Henry Fuchs
Attys.

May 29, 1951 G. E. DATH 2,554,562
LEVER MECHANISM
Filed July 16, 1949 3 Sheets-Sheet 3
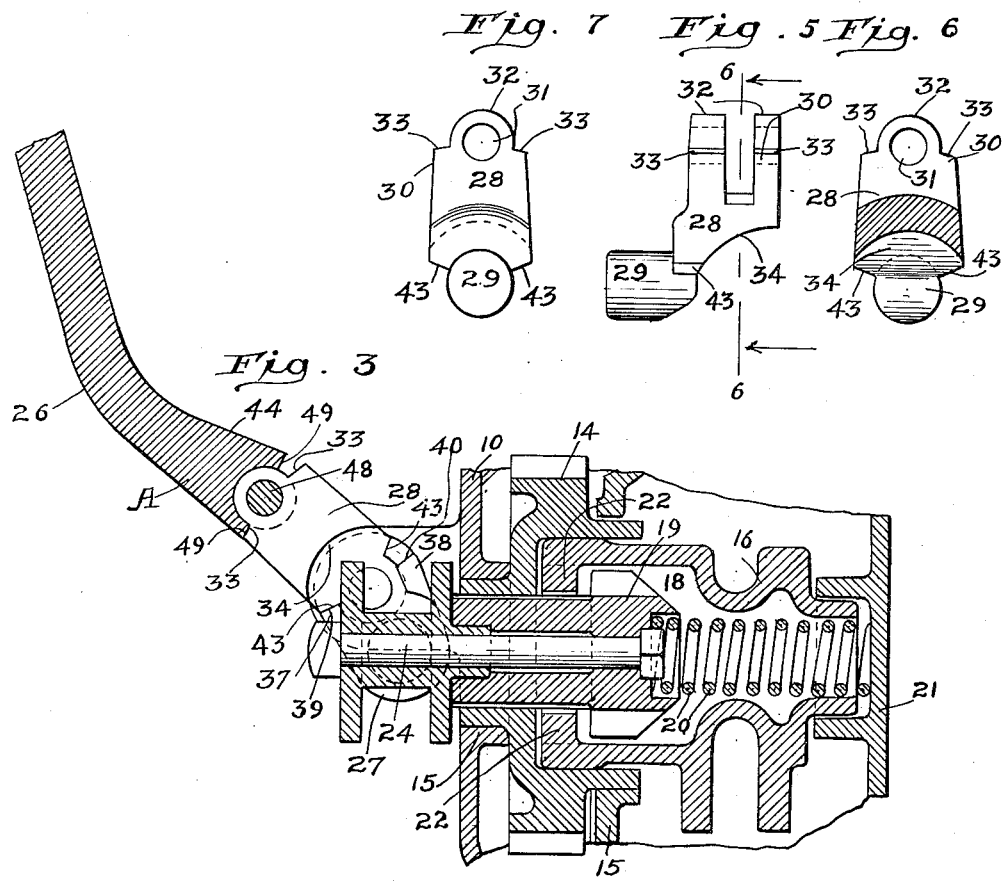
Inventor:
George E. Dath.
By
Henry Fuchs.
Attys.

Patented May 29, 1951

2,554,562

UNITED STATES PATENT OFFICE 2,554,562

LEVER MECHANISM

George E. Dath, Mokena, Ill., assignor to W. H. Miner, Inc., Chicago, Ill., a corporation of Delaware Application July 16, 1949, Serial No. 105,198

3 Claims. (Cl. 74—102)

This invention relates to improvements in lever means for actuating the clutch of a hand brake mechanism for railway cars.

One object of the invention is to provide in a power multiplying, gear actuated hand brake mechanism, including a winding drum and a clutch for operatively connecting the power multiplying gear mechanism to the drum, lever means for actuating the clutch including an upstanding lever arm, composed of a plurality of pivotally connected sections, having a predetermined amount of lost motion with respect to each other to permit throw of the weighted operating handle end of the lever to one side of the vertical, whereby the same is subjected to the influence of gravity to effect operative engagement of the clutch.

Other objects of the invention will more clearly appear from the description and claims hereinafter following.

Figure 1:
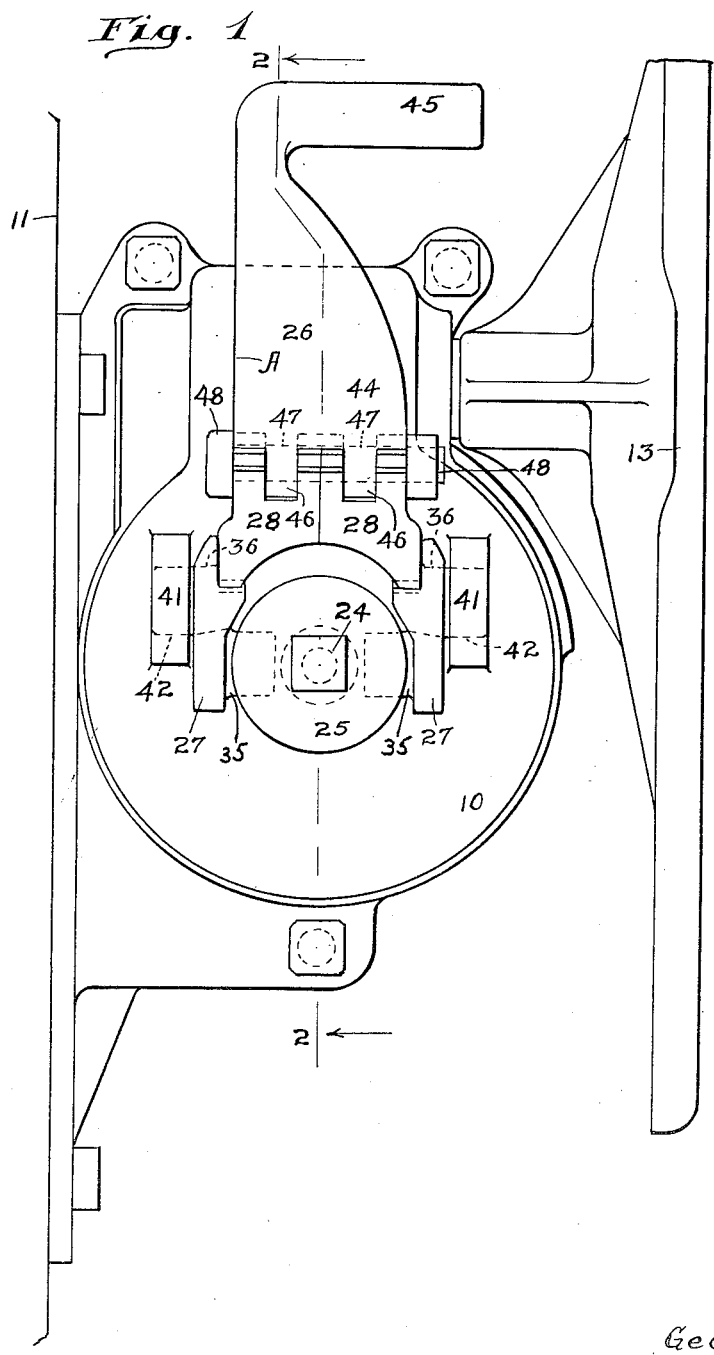
Figure 2:
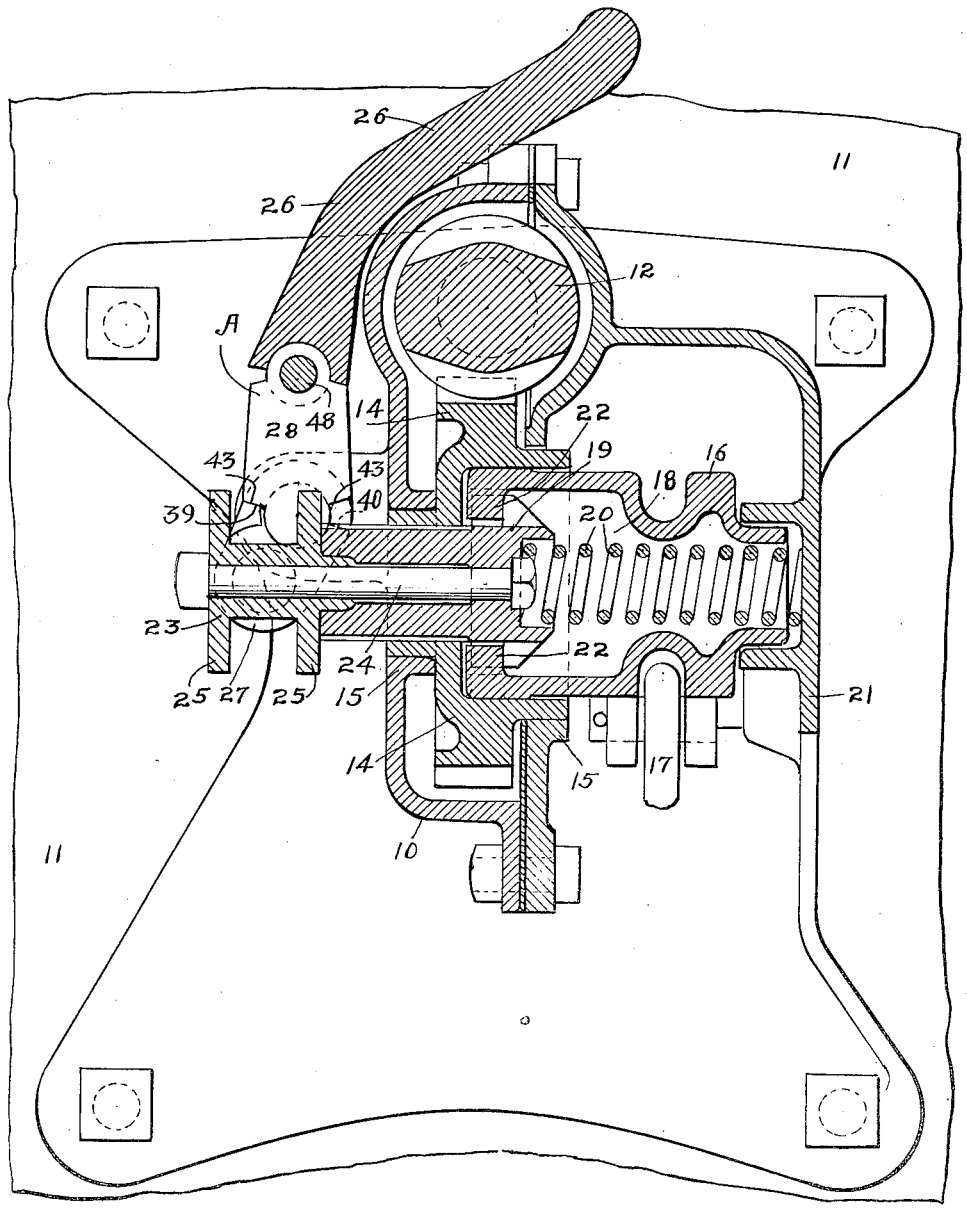

In the accompanying drawings forming a part of this specification, Figure 1 is a side elevational view of a hand brake mechanism, embodying my improvements, the hand brake mechanism being illustrated as mounted on the end wall of a railway car. Figure 2 is a vertical sectional view, corresponding substantially to the line 2—2 of Figure 1. Figure 3 is a broken view, similar to Figure 2, showing the operating handle lever arm and the clutch in different positions. Figure 4 is a view of the operating handle lever shown in Figure 2, illustrating the handle section thereof in two different positions, one position in full lines and the other in dotted lines, the latter corresponding to that shown in Figure 2. Figure 5 is a side elevational view of one of the lower end sections of the actuating lever. Figure 6 is a vertical sectional view, corresponding substantially to the line 6—6 of Figure 5. Figur 7 is an elevational view of Figure 5, looking from left to right in said figure. Figure 8 is a side elevational view of one of the intermediate sections of the actuating lever. Figure 9 is a side elevational view of Figure 8, looking from left to right in said figure.

In said drawings, 10 indicates the housing of a hand brake mechanism, which housing is secured to the end wall 11 of a railway car. The brake mechanism in connection with which my improved clutch actuating lever mechanism is employed is, as shown, of the worm and worm wheel, power multiplying type. The worm of the hand brake is indicated by 12 and is rotated by the usual hand wheel, indicated by 13. The worm 12 is in driving engagement with a worm wheel 14. The worm wheel 14 is rotatable about a horizontal axis and has hub sections thereof journaled in bearing members 15—15, provided in the housing 10. The chain winding drum of the brake is indicated by 16 and is rotatable about an axis coincident with the axis of the worm wheel 14. The drum has the usual chain winding section, and the brake chain 17 is connected thereto in the usual manner, and in tightening the brakes is wound on the drum. The drum is hollow, as indicated at 18, to accommodate the sliding member 19 of the clutch means and the clutch spring 20. As shown in Figure 2, the spring 20 is in the form of a helical coil, bearing at its left hand end on the sliding clutch member 19 and at its right hand end on the side wall 21 of the housing 10, the right hand end of the drum 16 being open for this purpose. The mechanism illustrated, comprising the sliding clutch member 19, the worm wheel 14, and the worm 12, is similar to the mechanism illustrated in Patent No. 1,974,581, granted to Roland J. Olander, September 25, 1934, and operates in a like manner, the clutch member 19 serving to operatively connect the winding drum 16 to the worm wheel 14 and rotary movement of the drum is thus effected when the hand wheel is rotated. The clutch member 19 is held operatively engaged with the clutch means of the drum 16 by the spring 20. The clutch means on the drum 16 comprises an annular series of interior projections or teeth 22, which cooperate with similar projections or teeth on the clutch member 19. The clutch member 19 is splined to the worm wheel 14 to rotate in unison therewith. As is well known, the chain 17 leads to the brake mechanism proper of the car and is fixed to the drum to be wound on the latter in the usual manner. At the outer or left hand end, as seen in Figure 2, the clutch member 19 carries a spool 23, which is fixed to said member by a bolt 24, extending axially through said spool and member. The spool 23 is provided with a pair of spaced, annular flanges 25—25, which cooperate with my improved clutch actuating lever mechanism, hereinafter described.

In carrying out my invention, I provide a jointed operating lever A for shifting the clutch member 19. The jointed lever A comprises an actuating hand grip or outer section 26, a pair of inner end sections 27—27 forming a forked portion, and a pair of intermediate sections 28—28 connecting the forked portion to the hand grip section 26.

As shown in Figures 5, 6, and 7, each intermediate section 28 has a laterally outwardly projecting, cylindrical trunnion 29 at its lower end, and a forked head 30 at its upper end, provided with a pin receiving opening 31, extending transversely through the two arms of said forked head 30. Each arm of the forked head 30 has the upper end portion thereof rounded off, thereby providing a bearing portion 32. The bearing portion 32 is of reduced size, thus providing transverse stop shoulders 33 and 33 at opposite sides of the head 30. Between the trunnion 29 and the head 30 of the section 28, the inner side of said section is cut away on an arc, as indicated at 34, to clear the top of the spool 23 in the assembled condition of the jointed lever.

As shown in Figures 8 and 9, each inner end section 27 is in the form of an elongated flat plate, rounded off at its top and bottom ends. The platelike section 27 has a laterally projecting trunnion 35 at its lower end at one side thereof, as seen in Figure 9. The upper end of the section 27 is provided with a transverse bearing opening 36 therethrough, adapted to accommodate the trunnion of the corresponding section 28. At the opposite sides of the opening 36, below the axial center thereof, two projecting stop lugs 37 and 38 are provided on the section 27, which stop lugs project from the same side thereof as the trunnion 35. As shown, the stop lugs 37 and 38 are on opposite sides of the opening 36 and present inclined stop faces 39 and 40 at their upper ends. The two inner end sections 27—27 are disposed at opposite sides of the spool 23 of the clutch member 19, with the trunnions 35—35 thereof engaged between the flanges 25—25 of said spool. The sections 27—27 are embraced between two outstanding supporting lugs 41—41 on the housing 10 of the brake mechanism, as clearly illustrated in Figure 1.

The intermediate sections 28—28 are disposed at opposite sides of the center line of the lever mechanism A with the trunnions 29—29 thereof projecting laterally outwardly in opposite directions. The trunnions 29—29 extend through the openings 36—36 of the sections 27—27 and have their outer ends engaged in bearing openings 42—42 provided in the lugs 41—41. The trunnions 29 thus serve to pivotally connect the sections 28 to the sections 27 and support the lever mechanism A for swinging movement on the supporting lugs 41. The lower end portion of each section 28 presents inclined transverse stop shoulders 43—43 at opposite sides of the trunnion 29 thereof, extending substantially radially of said trunnion and adapted to engage the stop lugs 37 and 38 of the corresponding end section 27 to limit relative swinging movement of the sections 28 and 27 with respect to each other.

The hand grip or outer end section 26 of the lever mechanism comprises the main body portion 44, which is relatively wide at its lower end, and a laterally projecting, right angular, hand grip portion 45 at the upper end of the body portion 44. The lower end of the body portion 44 is recessed to accommodate the bearing portions 32—32 and 32—32 of the sections 28 and 28, and presents two laterally spaced, depending ears 46—46, which are engaged between the arms of the forked heads 30 of the respective sections 28 and 28.

The ears 46—46 are perforated, as indicated at 47, and the section 26 is pivotally connected to the sections 28—28 by a bolt 48 engaged through the perforations 47—47 of the ears 46—46 and the openings 31—31 of the forked portions of the sections 28—28. The bottom end portion of the body portion 44 of the section 26 of the lever is provided with stop shoulders 49—49, which are radial to the bolt 48 and cooperate with the shoulders 33—33 of the section 28 to limit relative swinging movement of the section 26 and sections 28—28 with respect to each other.

The operation of the improved lever mechanism is as follows: To release or disengage the drum from operative relation with the worm wheel, the operating lever A is swung to the left by the hand grip section 26 thereof, from the position shown in Figure 1 to the position shown in Figure 3, thereby through engagement of the shoulder 49 of the section 26 with the shoulders 33—33 of the sections 28—28, and the coperating shoulders 43 and 39 of the sections 28—28 and 27—27, swinging the latter in contra-clockwise direction, as viewed in Figures 2 and 3, thereby shifting the clutch member 19 to the right, as viewed in Figure 3, and disengaging the same from the cooperating clutch means of the drum, thus releasing the drum from the worm wheel to permit free rotation of the drum to release the brakes.

To reengage the clutch member 19 with the drum 16, to render the winding mechanism of the brake operative, the section 26 is swung to the right from the position shown in Figure 3 back to that shown in Figure 2. During the first part of this movement of the section 26, the latter moves to the right with respect to the sections 28—28 until the shoulders 49—49 of the section 26 engage the cooperating shoulders of the sections 28—28, whereupon the sections 28—28 will be moved in unison with the section 26. This movement of the section 26 and the sections 28—28 in unison about the pivotal axis of the trunnions 29—29 of the sections 28—28 continues until the shoulders 43—43 of the sections 28—28 come into engagement with the stop faces 40—40 of the sections 27—27 to swing the latter and shift the clutch member. The spring 20 also urges the clutch member 19 to the left from the position shown in Figure 3 to that shown in Figure 2, thus assisting the lever in moving the clutch member 19 into engagement with the teeth of the drum 16. As will be seen upon reference to Figure 2, when engagement of the clutch member has been effected by the lever mechanism, the hand grip section 26 of the lever mechanism is arrested by engagement with the housing 10, and the spring 20 forces the clutch to its final position, swinging the sections 27—27 of the lever to a limited extent with respect to the sections 28—28.

In the event that the clutch teeth of the clutch member 19 are not aligned with respect to the clutch teeth of the drum so as to engage between said teeth, when the attendant throws the lever A, as hereinbefore described, to effect engagement of the clutch member, the jointed relation of the sections of the lever A permits the outer section 26 to be swung to a position beyond the vertical, so that the weight of the section 26, assisted by the spring 20, will throw the clutch member 19 into engagement when the hand wheel is rotated in brake tightening direction.

In other words, the jointed arrangement of the operating lever permits the hand grip section or outer end section of the lever A to be swung to a position beyond the vertical where its weight cannot act to throw the same in direction to disengage the clutch member.

I claim:

1. In a lever mechanism for shifting a slidable element, the combination with a member swingingly supported at its upper end and having trunnion means at its lower end, engaging the slidable element to shift the same; of a second member pivotally connected at its lower end to the upper end of said first named member; a lever arm pivotally connected at its lower end to the upper end of said second named member; and interengaging shoulders on said first and second named members and on said second named member and lever arm for limiting relative swinging movement of said members with respect to each other and said second named member with respect to said lever arm.

2. In a lever mechanism for shifting a slidable element, the combination with a member swingable about its upper end and having laterally projecting trunnions at its lower end adapted to engage with said element; of a second member having a horizontally projecting bearing portion at its lower end supported for swinging movement on a fixed support and extending through the upper end of said first named member to pivotally support the same; a lever arm pivotally connected at its lower end to the upper end of said second named member; and interengaging shoulders on said first and second named members and on said second named member and lever arm for limiting relative swinging movement of said members with respect to each other and of said second named member with respect to said lever arm.

3. In a lever mechanism for shifting a slidable element, the combination with an upper section; of a bottom section; and an intermediate section forming a jointed lever, said intermediate section comprising a pair of members having forked upper ends, and laterally outwardly projecting trunnions at their lower ends, said trunnions being journaled in fixed supports, said upper section having ears at its lower end engaged between the arms of the forked portions of said intermediate sections, said arms of said forks and said ears being connected by a bolt extending therethrough for pivotally connecting said upper section to said intermediate section, said bottom section comprising a pair of laterally spaced members having their upper ends swingingly supported on said trunnions of said intermediate sections, said members of said bottom section having trunnions on their inner sides adapted to connect with said slidable element, said top member and intermediate members having interengaging shoulders, and said intermediate members and said bottom members having interengaging shoulders for limiting relative swinging movement of said top and intermediate members and said intermediate and bottom members with respect to each other.

GEORGE E. DATH.

REFERENCES CITED

The following references are of record in the file of this patent:

UNITED STATES PATENTS

| Number | Name | Date |
|---|---|---|
| 456,827 | Johnson | July 28, 1891 |
| 951,845 | Rundle et al. | Mar. 15, 1910 |
| 1,882,839 | Haseltine | Oct. 18, 1932 |
| 2,281,143 | Dickerson | Apr. 28, 1942 |
| 2,293,504 | Higgins | Aug. 18, 1942 |
| 2,439,941 | Lounsbury | Apr. 20, 1948 |